United States Patent
Liu et al.

(10) Patent No.: US 8,861,086 B2
(45) Date of Patent: Oct. 14, 2014

(54) COMPACT SPECTROMETER INCLUDING A DIFFRACTIVE OPTICAL ELEMENT WITH DUAL DISPERSION AND FOCUSING FUNCTIONALITY

(75) Inventors: Zhiwen Liu, State College, PA (US); Chuan Yang, State College, PA (US); Kebin Shi, Beijing (CN); Perry Edwards, State College, PA (US)

(73) Assignee: The Penn State Research Foundation, University Park, PA (US)

( * ) Notice: Subject to any disclaimer, the term of this patent is extended or adjusted under 35 U.S.C. 154(b) by 307 days.

(21) Appl. No.: 13/208,922

(22) Filed: Aug. 12, 2011

(65) Prior Publication Data
US 2012/0038918 A1 Feb. 16, 2012

Related U.S. Application Data

(60) Provisional application No. 61/373,501, filed on Aug. 13, 2010.

(51) Int. Cl.
| | |
|---|---|
| *G02B 5/18* | (2006.01) |
| *G02B 3/08* | (2006.01) |
| *G01J 3/40* | (2006.01) |
| *G01J 3/28* | (2006.01) |
| *G01J 3/02* | (2006.01) |
| *G01J 3/18* | (2006.01) |
| *B29D 11/00* | (2006.01) |
| *G02B 27/42* | (2006.01) |
| *G02B 1/06* | (2006.01) |

(52) U.S. Cl.
CPC ........ *B29D 11/00769* (2013.01); *G02B 5/1814* (2013.01); *G01J 3/0208* (2013.01); *G01J 3/18* (2013.01); *G02B 1/06* (2013.01); *B29D 11/00269* (2013.01); *G02B 3/08* (2013.01); *G02B 27/4244* (2013.01)

USPC ............ 359/572; 359/742; 356/305; 356/328

(58) Field of Classification Search
USPC ......... 359/457, 565, 569–573, 576, 742, 832; 356/300–334
See application file for complete search history.

(56) References Cited

U.S. PATENT DOCUMENTS

| 4,385,430 A | 5/1983 | Bartels |
| 5,329,353 A * | 7/1994 | Ichimura et al. .............. 356/328 |

(Continued)

FOREIGN PATENT DOCUMENTS

| WO | 99/53350 A1 | 10/1999 |
| WO | 2009/120152 A1 | 10/2009 |

OTHER PUBLICATIONS

International Search Report and Written Opinion of the International Searching Authority for PCT/US2011/047596 dated Dec. 6, 2011 (Forms PCT/ISA/220, PCT/ISA/210, and PCT/ISA/237).

(Continued)

*Primary Examiner* — Stephone B Allen
*Assistant Examiner* — Kimberly N Kakalec
(74) *Attorney, Agent, or Firm* — Buchanan Ingersoll & Rooney PC (57) ABSTRACT

Embodiments of the invention provide a device called a "G-Fresnel" device that performs the functions of both a linear grating and a Fresnel lens. We have fabricated the G-Fresnel device by using PDMS based soft lithography. Three-dimensional surface profilometry has been performed to examine the device quality. We have also conducted optical characterizations to confirm its dual focusing and dispersing properties. The G-Fresnel device can be useful for the development of miniature optical spectrometers as well as emerging optofluidic applications. Embodiments of compact spectrometers using diffractive optical elements are also provided. Theoretical simulation shows that a spectral resolution of approximately 1 nm can be potentially achieved with a millimeter-sized G-Fresnel. A proof-of-concept G-Fresnel-based spectrometer with subnanometer spectral resolution is experimentally demonstrated.

9 Claims, 10 Drawing Sheets

(56) References Cited

U.S. PATENT DOCUMENTS

| | | |
|---|---|---|
| 5,497,269 A | 3/1996 | Gal |
| 5,526,338 A | 6/1996 | Hasman et al. |
| 5,731,874 A | 3/1998 | Maluf |
| 5,862,001 A * | 1/1999 | Sigler .................... 359/832 |
| 5,943,166 A | 8/1999 | Hoshi et al. |
| 6,282,034 B1 | 8/2001 | Onishi et al. |
| 6,452,675 B1 | 9/2002 | Müller et al. |
| 6,585,939 B1 | 7/2003 | Dapprich |
| 6,692,647 B2 | 2/2004 | Moshrefzadeh et al. |
| 6,804,055 B2 | 10/2004 | Peterson et al. |
| 7,170,600 B2 | 1/2007 | Nishii et al. |
| 2005/0117232 A1 * | 6/2005 | Forsberg .................... 359/843 |
| 2005/0254129 A1 * | 11/2005 | Clark et al. .................... 359/573 |
| 2006/0121358 A1 | 6/2006 | Rich et al. |
| 2007/0201148 A1 * | 8/2007 | Eckhardt .................... 359/742 |

OTHER PUBLICATIONS

Yang et al., "Demonstration of a PDMS based hybrid grating and Fresnel lens (G-Fresnel) device", Optics Express, Nov. 8, 2010, pp. 23529-23534, vol. 18, No. 23.

Yang et al., "Hybrid Diffractive Optical Element Based Spectrometer", Optical Society of America 2010.

Yang et al., "Proposal and Demonstration of a Spectrometer Using a Diffractive Optical Element with Dual Dispersion and Focusing Functinality", Optics Letters, Jun. 1, 2011, pp. 2023-2025, vol. 36, No. 11.

* cited by examiner

COMPACT SPECTROMETER INCLUDING A DIFFRACTIVE OPTICAL ELEMENT WITH DUAL DISPERSION AND FOCUSING FUNCTIONALITY

CROSS-REFERENCE TO RELATED APPLICATIONS

This application claims priority to U.S. Provisional Patent Application No. 61/373,501, filed on Aug. 13, 2010, and incorporated by reference herein.

STATEMENT REGARDING FEDERALLY SPONSORED RESEARCH OR DEVELOPMENT

This invention was made with government support under Grant No. DBI0649866 and ECCS0547475, awarded by the National Science Foundation. The Government has certain rights in the invention. The Fresnel lens used to fabricate the negative Fresnel mold was acquired through the OIDA Photonics Technology Access Program sponsored by the National Science Foundation and the Defense Advanced Research Projects Agency. The optical profilometric characterization was performed at the Pennsylvania State University Materials Research Institute Nanofabrication Lab under the National Science Foundation Cooperative Agreement No. 0335765, National Nanotechnology Infrastructure Network, with Cornell University.

BACKGROUND OF THE INVENTION

1. Field of the Invention

Embodiments of the invention relate to diffractive optical elements that have the dual properties necessary to focus and disperse an impinging optical wave, master devices for replicating the diffractive optical elements, and compact spectrometers including these optical elements.

2. Description of the Related Art

The optical spectrometer has become one of the most important and most widely used instruments in modern science and engineering. See J. James, *Spectrograph Design Fundamentals* (Cambridge University Press, Cambridge, 2007). It has found a myriad of applications in numerous areas such as material characterization, chemical sensing, and biomedical diagnostics. As optical spectroscopy continues to play a vital role in many of today's rapidly developing fields and with the boom of portable electronic industry (cell phones, laptop computers, etc.), there is a growing need for development of cost-effective and miniature spectrometers that can be potentially integrated with these portable electronics devices.

Despite a steady progress on the spectrometer performance, the use of discrete optical components (i.e., the collimating and collecting curved mirrors and the diffraction grating) has been a main reason that conventional optical spectrometers are usually bulky and costly. Various efforts have been made to address this issue. As a well-known example, concave gratings integrate the functions of the collimating and collecting curved minors as well as the diffraction grating in one device. See C. Palmer, and E. Loewen, *Diffraction grating handbook* (Newport Corporation, 2005). A volume holographic spectrometer has also been recently investigated, which can eliminate the entrance slit, collimating and collecting curved minors, as well as the grating all together with a volume hologram. See C. Hsieh, O. Momtahan, A. Karbaschi, and A. Adibi, Appl. Phys. B 91, 1 (2008). Other devices such as waveguide grating couplers and integrated micromechanical systems are known.

BRIEF SUMMARY OF THE INVENTION

Embodiments of the invention provided herein relate to a diffractive optical element that integrates the functions of high-numerical-aperture lenses (possibly Fresnel lenses) with diffraction gratings. The elements may be curved or planar. We call those elements incorporating gratings and Fresnel lenses "G-Fresnel" devices, referred to interchangeably as "G-Fresnel" lenses or simply "G-Fresnel." Other embodiments may use other diffractive optical elements, including, for example, but not limited to a single sided surface structure, or a G-Fresnel device for new compact spectrometer design.

Further embodiments relate to production of a G-Fresnel lens using polydimethylsiloxane (PDMS) soft lithography. This fuses the functions of a grating and a Fresnel lens into one hybrid device. Since a G-Fresnel lens can have a smaller f-number (f/#) compared with a conventional lens or a concave mirror, it can potentially be used in a more compact spectrometer than has been available using conventional technology. In addition, a G-Fresnel lens may have surface structures and hence can potentially allow for low-cost volume production by replicating a master pattern.

DETAILED DESCRIPTION OF THE FIGURES

DETAILED DESCRIPTION OF THE INVENTION

Embodiments provide a "G-Fresnel" device, which has the dual functionalities of a grating and a Fresnel lens. We showed in theoretical analysis that the G-Fresnel can both image a point source and disperse its various wavelength components. Double-sided transmission and reflection type G-Fresnel devices were fabricated by using PDMS based soft lithography. We also performed 3D surface profilometric measurements to evaluate the quality of the fabricated devices. Finally, optical characterization was performed to experimentally verify the dual focusing and dispersing properties of this device. With its potential for volume production through surface pattern replication and achieving a small f/#, the G-Fresnel can open a promising avenue for developing cost-effective, compact, and portable optical spectrometers.

An embodiment of the invention provides an optical element having a Fresnel side including a plurality of concentric chirped annular grooves, with groove of smaller pitch than the preceding one. The element also includes a grating side comprising a plurality of linear grooves. Typically, these grooves are parallel to each other.

In some embodiments one or both sides of the element include a coating or surface treatment. In a preferred embodiment a reflective film coats the grating side. Other coatings may permit the passage of light of only specific frequencies. Coatings may be, for example, but are not limited to metallic film, liquid metal and dielectric film coatings.

These spectrometers may be useful for scientific field use, or for consumer use; for example, a spectrometer might be used in a cellular phone to allow a person who is dining to detect the presence of undesired allergens in their food. Applications may also exist for providing a broad array of miniaturized spectrometers for use in astrophysics and space science applications. Other applications may include counterfeit document and paper currency detection, chemical detection, and biomedical applications.

Considering that the G-Fresnel element can be easily integrated with the optofluidic devices fabricated by PDMS soft lithography, we believe that the G-Fresnel can also find exciting applications in the emerging field of optofluidics (for a discussion of optofluidics, see Y. Fainman, L. P. Lee, D. Psaltis and C. Yang, *Optofluidics-Fundamentals, Devices and Applications* (McGraw-Hill, 2010)) such as on-chip spectroscopy.

Other embodiments may provide a method for fabricating a diffractive optical element, including imaging a prepolymer on the surface of a Fresnel lens and curing said first prepolymer thereby forming a negative Fresnel lens mold. Curing may be done in situ. A second prepolymer is then placed between the negative Fresnel mold and a grating, and the second prepolymer is cured, forming a diffractive optical element.

A number of different prepolymers may be used. For example, the first prepolymer may be polydimethylsiloxane, and the second prepolymer may be polydimethylsiloxane. The G-Fresnel material could be other solid state material, for example glass, plastic, or other type of polymers, such as SU8, PMMA. It may be made of a biopolymer, which may be, for example, silk. see F. G. Omenetto and D. L. Kaplan, "New Opportunities for an Ancient Material," Science 329, 528-531 (2010). It may also be made from tunable/dynamic liquid/fluidic materials in an optofluidic system setting.

Figure 10:
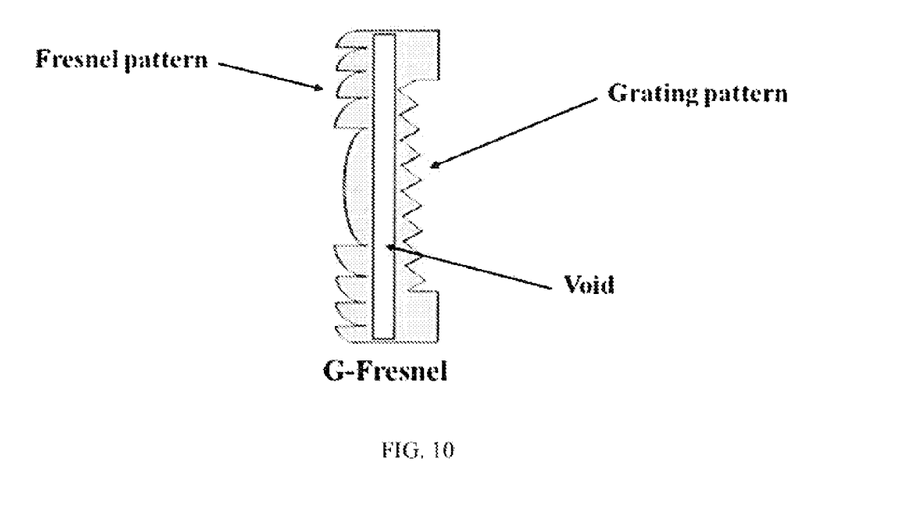
FIG. 10 shows an embodiment of an optical element having a cavity between the Fresnel side and the grating side.

Embodiments of the invention may be particularly suited for optofluidics applications. For example, one may use the mold system described above to create a G-Fresnel with a cavity between the Fresnel side and the grating side. This may be done, for example, by having a negative Fresnel mold and a negative grating mold separated by a void, as shown in FIG. 10. In another embodiment in which the Fresnel and grating elements are on the same side of the G-Fresnel, there may be a cavity between the side of the G-Fresnel with the diffractive elements and the flat bottom.

Once the cavity is created it may be filled with various fluids, including atmospheric air, water, an alcohol, a gaseous compound or element, or any other fluid selected by one skilled in the art. In this way the properties of a single G-Fresnel may be tuned to meet the needs of specific applications by altering the fluidic component and therefore altering the path of radiation through the optical element.

In a further embodiment of the invention the optical element includes a plurality of voids. For example, an optical element might have a Fresnel component on one side, a grating component on the other side, and a void separating the two. That void might be further bisected into two separate voids, one touching upon the Fresnel side and the other the grating side. This would allow independent modification of the fluidics of each side of the optical element.

Embodiments of the invention may (but are not required to) provide a number of advantages. For example, they may combine the functions of collimation, dispersion, and collection in a single thin-film element. Second, they may have a low f-number, leading to a compact system. Third, they may be realized by surface relief patterning, which creates the possibility of low-cost production by creation from a master blank. Of course, no particular embodiment is required to have all of these advantages unless required by the claims.

Figure 1:
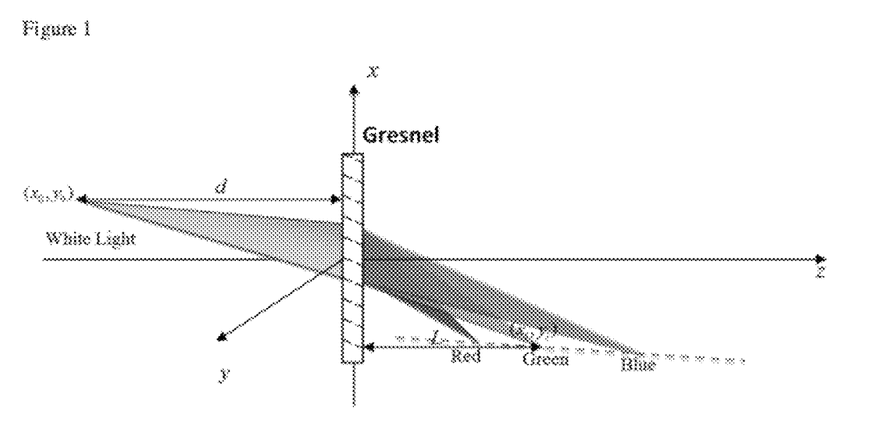
FIG. 1 provides a schematic diagram illustrating the dual focusing and dispersing properties of a transmission-type G-Fresnel (T-G-Fresnel).

To possess the dual properties of a lens and a grating, the desired field transmission (or reflection) coefficient of a diffractive optical element may be given by $$t(x, y) \propto \eta(\lambda) e^{-j\frac{\pi}{\lambda F}(x^2+y^2)} e^{j\frac{2\pi}{\Lambda}x} \quad (1)$$

where $\lambda$ is the wavelength, F is the focal length at $\lambda$, $\Lambda$ is the grating period, and $\eta$ represents the diffraction efficiency of the device. Since Eq. (1) comprises the product of the transmittances of a Fresnel lens and a linear grating, the diffractive optical element is referred to as G-Fresnel in the following discussion. Consider a point source located at $(x_0, y_0, -d)$ (c.f., FIG. 1-$a$). Under the paraxial approximation, the field distribution after the G-Fresnel can be obtained by applying the Fresnel diffraction formula (reported in J. W. Goodman, *Introduction to Fourier Optic* (Roberts & Company, Englewood, Colo., 1996) and is given by $$f(x, y, z) \propto \int\int e^{j\frac{\pi}{\lambda d}[(x'-x_0)^2+(y'-y_0)^2]} p(x', y') \quad (2)$$
$$e^{-j\frac{\pi}{\lambda F}(x'^2+y'^2)} e^{j\frac{2\pi}{\lambda}x'} e^{j\frac{\pi}{\lambda z}[(x-x')^2+(y-y')^2]} dx'dy' \propto$$
$$\int\int e^{j\frac{\pi}{\lambda}(\frac{1}{d}-\frac{1}{F}+\frac{1}{z})(x'^2+y'^2)} p(x', y') e^{-j2\pi[(\frac{x_0}{\lambda d}-\frac{1}{\Lambda}+\frac{x}{\lambda z})x'+(\frac{y_0}{\lambda d}+\frac{y}{\lambda z})y']} dx'dy'$$

where $p(x, y)$ is the pupil function of the G-Fresnel. It can be shown that the geometrical image of the point source is located at $(x_i, y_i, L)$, where $$x_i = -\frac{L}{d}x_0 + L\frac{\lambda}{\Lambda}, \quad y_i = -\frac{L}{d}y_0, \quad L = \frac{Fd}{d-F} = \frac{d}{\lambda d/\lambda_0 F_0 - 1} \quad (3)$$

and $\lambda_0$ and $F_0$ are the design wavelength and design focus length of the G-Fresnel respectively (note: $\lambda F=\lambda_0 F_0$; see Francis T. S. Yu, An Introduction to Diffraction, Information Processing, and Holography (The MIT Press, 1973); K. Shi, *Supercontinuum Imaging and Spectroscopy*, Penn State Doctoral Dissertation, 2007.). Therefore, a G-Fresnel can both image a point source (i.e., lens property) and disperse its different wavelength components (i.e., grating property). It can be shown from Eq. (3) that a linear relationship holds between $x_i$ and $L$, i.e., $$L = \frac{\Lambda d}{\lambda_0 F_0 - x_0 \Lambda} x_i - \frac{\lambda_0 F_0 d}{\lambda_0 F_0 - x_0 \Lambda} \quad (4)$$

In other words, the foci of the different wavelengths lie on a line with a slope ($dL/dx_i$) given by $$\frac{\Lambda d}{\lambda_0 F_0 - x_0 \Lambda}.$$

Note that Eq. (1) can be rewritten as $$t(x, y) \propto \eta(\lambda) e^{j\frac{\pi}{\lambda F}x_c^2} e^{-j\frac{\pi}{\lambda F}[(x-x_c)^2+y^2]} \quad (5)$$

where $x_c = \lambda F/\Lambda$. In other words, a G-Fresnel device is equivalent to an off-axis Fresnel lens with its center shifted to $(x_c, 0)$. However, since the circular grating period of a Fresnel lens is chirped and is inversely proportional to the distance from the center, such off-axis Fresnel lens becomes increasingly challenging to fabricate for large $x_c$. For instance, consider a grating period $\Lambda \sim \lambda$. The effective center shift is given by $x_c \sim F$, which would require a large Fresnel lens with sub-wavelength features. A G-Fresnel device can also be interpreted as a thin hologram recorded by a diverging spherical reference wave and a converging signal wave. The hologram is given by $$t_H \propto |e^{j\frac{\pi}{\lambda l}(x^2+y^2)} + e^{-j\frac{\pi}{\lambda l}[(x-x_c)^2+y^2]}|^2 = \quad (6)$$
$$2 + \{e^{-j\frac{\pi}{\lambda l}(x^2+y^2)} e^{-j\frac{\pi}{\lambda l}[(x-x_c)^2+y^2]} + c.c.\} =$$
$$2 + [e^{-j\frac{\pi}{\lambda l}x_c^2} e^{-j\frac{\pi}{\lambda l}(x^2+y^2)} e^{j\frac{2\pi}{\lambda l/x_c}x} + c.c.]$$

The first term in the bracket of Eq. (6) (second line) is essentially a G-Fresnel device if one assigns $F=\frac{1}{2}$ and $\Lambda=\lambda l/x_c$. However, a thin hologram also contains a conjugate term (c.f. Eq. 6) and usually has limited diffraction efficiency.

Device Fabrication and Characterization

Example 1

Fabrication by PDMS Soft Lithography

Figure 2:
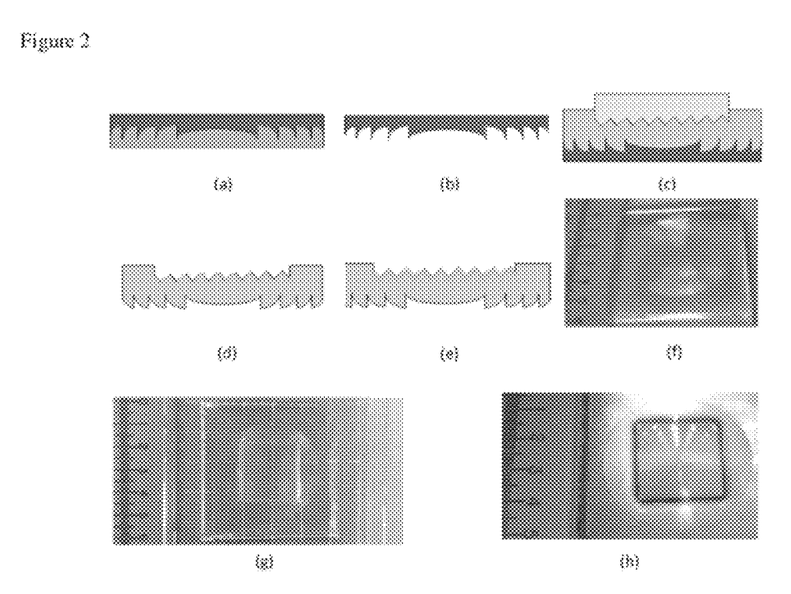
FIG. 2 provides a schematic diagram illustrating the procedure of fabricating a G-Fresnel device; (a): PDMS pre-polymer mix is poured onto the surface of a Fresnel lens; (b): after it is in situ cured, a negative Fresnel lens mold is formed and can be peeled off; (c) PDMS pre-polymer is sandwiched between the negative Fresnel mold and a grating; (d): after curing a transmission type G-Fresnel is fabricated; (e): a reflection-type G-Fresnel device can be readily obtained by coating the grating side of a transmission type G-Fresnel device with a thin layer of reflective film; (f): a photo of a fabricated negative Fresnel mold; (g): a photo of a fabricated transmission-type G-Fresnel device; and (h): a photo of a fabricated reflection-type G-Fresnel device (grating surface facing up).

In this example we describe a simple method to fabricate the G-Fresnel device by using PDMS soft lithography. For a general discussion of soft lithography see J. A. Rogers, R. G. Nuzzo, "Recent progress in soft lithography," *Materials Today*, 8, 2, 50-56 (2005). The fabrication procedure is illustrated in FIG. 2. Briefly, PDMS pre-polymer mix (Dow Corning, Sylgard-184 PDMS, base to curing agent weight ratio 10:1) is poured onto the surface of a Fresnel lens (c.f. FIG. 2-$a$, the Fresnel lens is in the bottom). After it is in situ cured at room temperature for two days, a negative Fresnel lens mold is formed and can be peeled off (c.f. FIG. 2-$b$). FIG. 2 ($f$) shows a negative Fresnel mold fabricated this way.

We then sandwich the PDMS pre-polymer between the negative Fresnel mold and a grating (Newport, 300 lines/mm) (c.f. FIG. 2-$c$). The grating is mounted on a linear translational stage, which can be used to adjust the distance between the two molds and hence the device thickness. After curing it for about two days at room temperature, a transmission-type G-Fresnel (T-G-Fresnel) device is fabricated (c.f. FIG. 2-$d$). A photo of a T-G-Fresnel device fabricated by using such method is shown in FIG. 2 ($g$). A reflection-type G-Fresnel (R-G-Fresnel) device can be readily obtained by coating the grating side of a T-G-Fresnel with a thin layer of reflective film as illustrated in FIG. 2 ($e$). FIG. 2 ($h$) shows a photo of R-G-Fresnel, of which the grating side was coated with a layer of 50-nm-thick Au film by using a sputtering system (Kurt Lesker CMS-18/RF).

Any coating which can reflect light within the wavelength range of interest and adhere to PDMS (or, if another material is used for the G-Fresnel, that can adhere to that material) can be used. These include, for example, but are not limited to metal film, liquid metal, and dielectric film are some of the options; The coating can be reflective, transmissive, or partially reflective/transmissive depending on specific applications. The coating can also provide filtering properties. A single G-Fresnel may have two or more different coatings on different sides and/or locations on the lens.

Although examples provided herein report fabrication by pre-polymer impression, a G-Fresnel may be fabricated in a number of ways. These include, for example, but are not limited to lithography (for example, soft lithography, focused ion beam nanomilling, photolithography or e-beam lithography); diamond turning; laser engraving and processing; holography, liquid G-Fresnel fabrication using optofluidic methods; and stamping or nanoprinting methods for volume replication.

Figure 3:
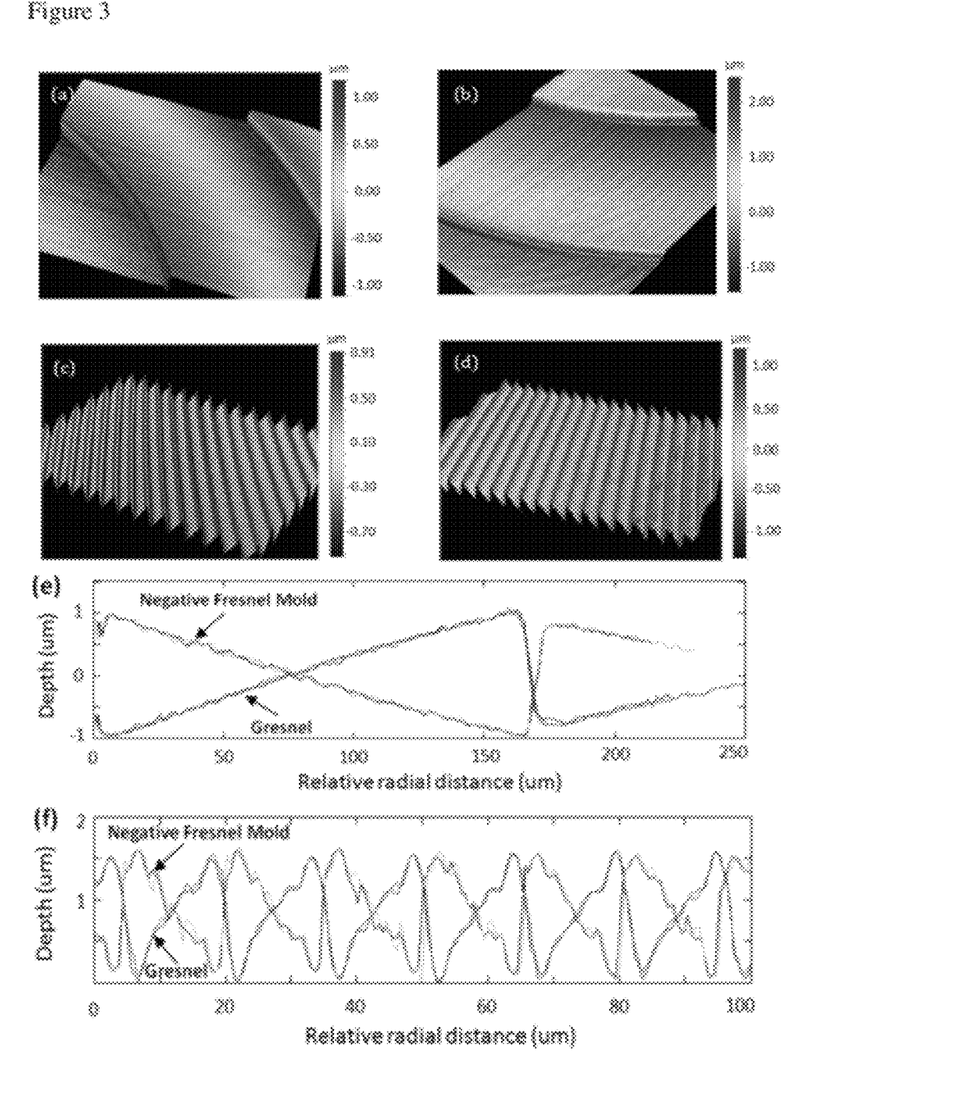
FIG. 3 provides typical surface profiles of a negative Fresnel mold and the Fresnel side of a transmission type G-Fresnel (T-G-Fresnel) device measured by optical profilometry. (a) and (b): 3D surface profile near the central parts of a negative Fresnel mold and the Fresnel side of a T-G-Fresnel device respectively; (c) and (d): 3D surface profiles near the peripheral parts of the negative mold and the T-G-Fresnel device respectively; (e) comparison of surface height profiles along the radial direction near the central parts of the mold and the T-G-Fresnel device; and (f) comparison of surface height profiles along the radial direction near the peripheral parts of the mold and the T-G-Fresnel device.

To examine the quality of the G-Fresnel devices fabricated by PDMS soft lithography, we utilized a profilometer (WYKO NT1100) to measure the three-dimensional (3D) surface profiles of a negative Fresnel mold as well as the Fresnel side of a fabricated T-G-Fresnel device. The results are given in FIG. 3, in which (a) and (b) show the typical 3D surface profiles near the central parts of the negative mold and the Fresnel side (of the G-Fresnel device) respectively while (c) and (d) show those near the periphery. FIGS. 3 (e) and (f) further show the typical surface height profiles along the radial direction near the central and peripheral parts of both devices. For the purpose of comparison, these plots are shifted by arbitrary amounts to align with each other. As expected, the height profiles of the negative Fresnel mold and the T-G-Fresnel device (Fresnel side) exhibit anti-correlation. Clearly, good-fidelity pattern transfer from the mold to the G-Fresnel device is achieved.

It is important to note that while the G-Fresnel reported herein achieves many advantages of both a Fresnel lens and a grating, the G-Fresnel is by no means a mere combination of the two. To the contrary, a G-Fresnel can be realized in a single-sided surface relief structure that does not resemble either a grating or a Fresnel lens at all. This implementation also allows for low cost volume production by replicating from a single master pattern.

A key requirement for implementing an optical spectrometer is to map a diverging wavefront emanating from a slit into wavelength-dispersed converging wavefronts for detection. A single diffractive optical element is desired for achieving this function to realize a compact spectrometer. The proposed G-Fresnel, which combines the properties of a grating and a Fresnel lens, provides a much simpler approach to accomplish this objective. Although gratings have been widely used in spectrometers, the use of Fresnel lenses is rare. To develop a compact spectrometer without significantly sacrificing resolution, one should try to maintain the grating aperture size while reducing the longitudinal dimension of the system. In our proposed design, the G-Fresnel is ideally suited for this purpose by providing a large numerical aperture and small f/#.

Figure 4:
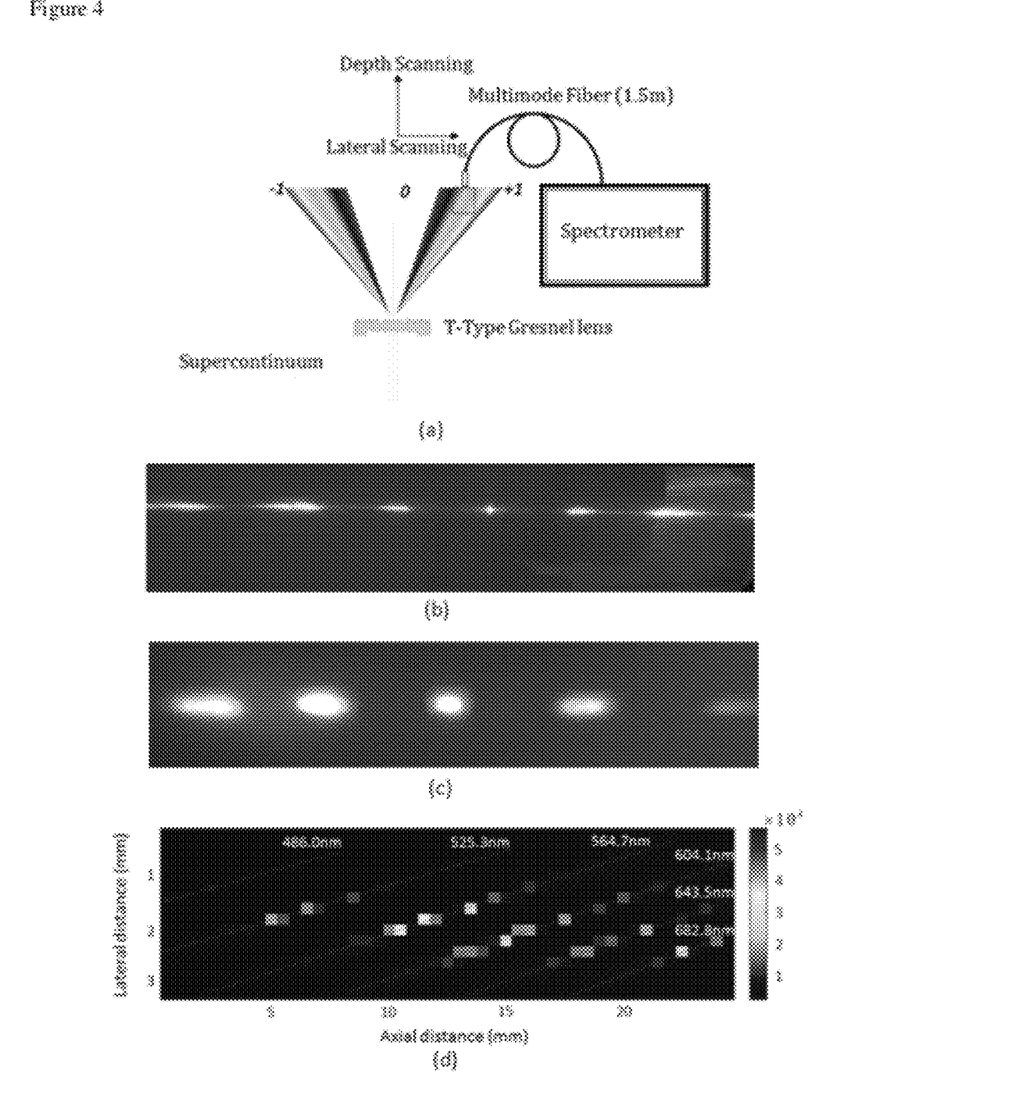
FIG. 4 provides optical characterization results; (a) schematic diagram of the experimental system; (b) a photo of a focused diffraction pattern produced by passing a collimated supercontinuum through a T-G-Fresnel; (c) diffraction pattern produced by a grating; (d) measured intensity distribution of several exemplary wavelengths (486.0 nm, 525.3 nm, 564.7 nm, 604.1 nm, 643.5 nm and 682.8 nm).

We have also performed optical characterization of a T-G-Fresnel device (shown in FIG. 2-g) by utilizing white light supercontinuum (see J. K. Ranka, R. S. Windeler and A. J. Stentz, "Visible continuum generation in air-silica microstructure optical fibers with anomalous dispersion at 800 nm," Opt. Lett. 25, 25-27 (2000)) generated by femtosecond laser pulses in a highly nonlinear photonic crystal fiber. (See J. C. Knight, T. A. Birks, P. S. Russell and D. M. Atkin, "All-silica single-mode optical fiber with photonic crystal cladding," Opt. Lett, 21, 1547-1549 (1996)). FIG. 4 (a) illustrates the schematic diagram of the experimental system. Briefly, a collimated supercontinuum beam (diameter: ~10 mm) was incident on the T-G-Fresnel. The transmitted beam became focused and consisted of several diffraction orders as shown in FIG. 4 (b). The central focused bright spot corresponds to the zero's order, i.e., directly transmitted beam, while the rainbows on both sides correspond to higher diffraction orders (±1, ±2 . . . , etc). On the contrary, if the collimated supercontinuum is directly incident on a grating, only an unfocused diffraction pattern can be produced as shown in FIG. 4 (c).

Figure 5:
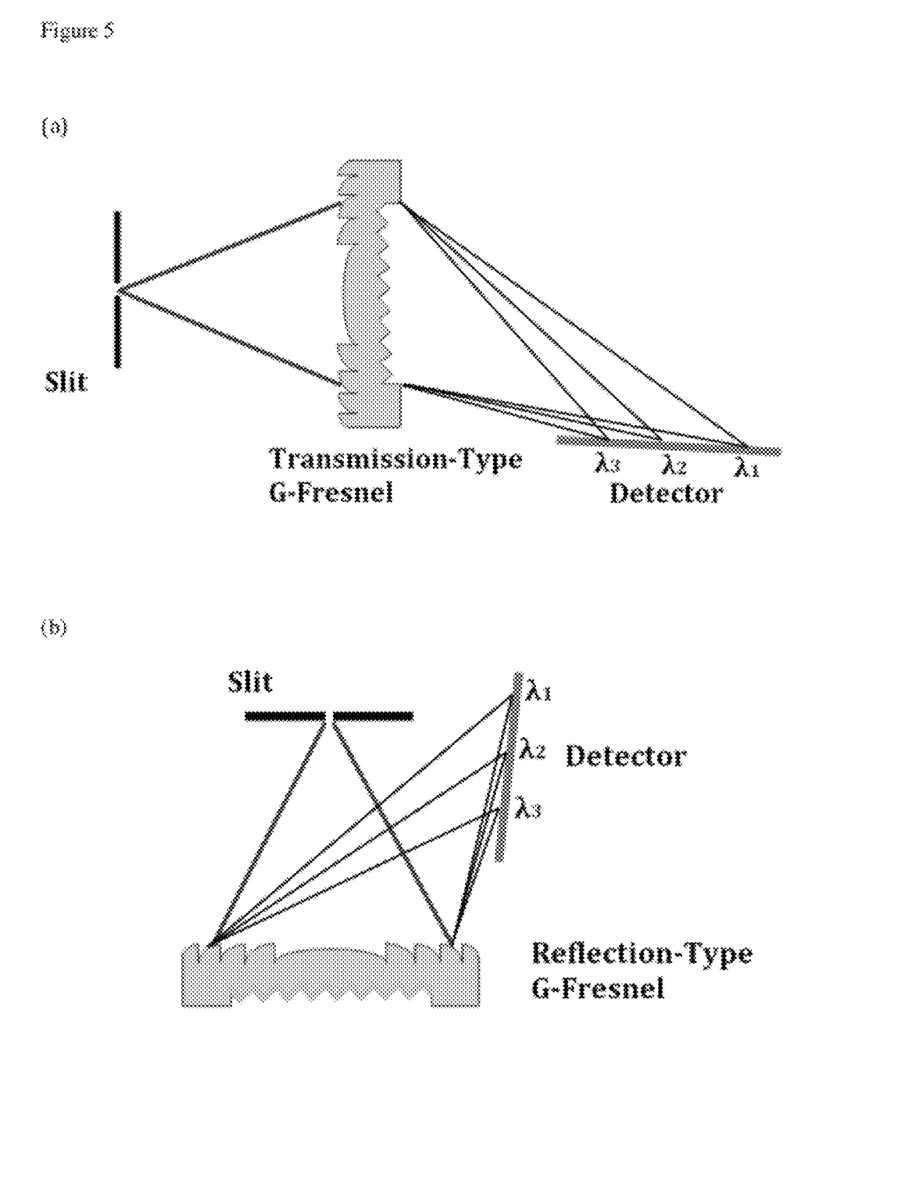
FIG. 5 shows a schematic of spectrometers comprising a transmission type or reflection type G-Fresnel device of exemplary embodiments of the invention.

To further study this dual focusing and dispersion properties, we utilized a multimode optical fiber as a probe, which was placed behind the T-G-Fresnel and scanned in two dimensions (i.e., along the axial and one lateral directions as illustrated in FIG. 4-a) by using motorized translational stages. The scanning covered an area of 4 mm (lateral)×25 mm (axial). The output of the multimode fiber was detected by a spectrometer (PI/Acton SpectraPro 2500 with a liquid nitrogen cooled charge coupled device detector PI/Acton Spec-10). FIG. 4 (d) presents the measured intensity distribution of several wavelength components. It shows that different wavelengths were focused by the T-G-Fresnel device and that they propagated along different directions. A spectrometer prepared according to one embodiment of the invention will look like FIG. 5. The main optical elements include an entrance slit, a G-Fresnel device and a linear detector array. The Reflective type G-Fresnel could allow for a more compact spectrometer design.

Our results demonstrate that the G-Fresnel device has the dual properties of a grating and a Fresnel lens, and can therefore both disperse and focus light. Note that according to Eq. (4) the foci trace of the different wavelengths is parallel to the optical axis (z), as a collimated supercontinuum was used (d→∞). This is in agreement with the measured result shown in FIG. 4 (d).

Example 2

Theoretical Resolution

Figure 6:
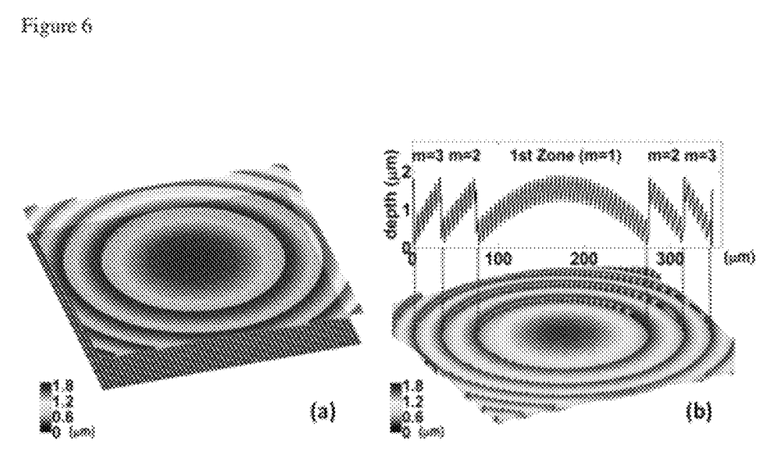
FIG. 6 shows a computer-generated surface profile (central part) of a double-sided miniature G-Fresnel (a) and a single-sided miniature G-Fresnel (b).

In example 2 we consider a hypothetical transmission-type G-Fresnel diffractive optical element. To achieve a dual functionality of dispersion and focusing, its transmittance is specified by $T(x, y) = T_G(x, y) T_F(x, y)$, where $T_G(x, y)$ represents the transmittance of a constituent grating and $T_F(x, y)$ denotes that of a constituent Fresnel lens. Both the grating and the Fresnel lens can be realized by surface relief pattern. Their transmittances are given by $$T_i(x, y) = e^{j\frac{2\pi}{\lambda}(n-1)h_i(x,y)} (i = G \text{ or } F) \quad (7)$$

in which $\lambda$ is the wavelength, n is the refractive index of the substrate material, and $h_G$ and $h_F$ are the respective surface height profiles. The G-Fresnel can be implemented by either placing the grating and the Fresnel lens separately on opposite sides (double-sided), or alternatively, superimposing them in one side of the device (single-sided). FIG. 6 shows the central portion of computer-generated surface profiles of a double-sided G-Fresnel [FIG. 6(a)], and alternatively a single-sided one whose surface height is a synthesis of those of the constituent grating and Fresnel lens, i.e. $h(x, y) = h_G(x, y) + h_F(x, y)$ [FIG. 6(b)].

In the simulation of this example, the grating profile $h_G(x, y)$ is selected to be a periodic saw wave with a pitch of 200 grooves per mm. The constituent continuous-relief Fresnel lens has a focal length of $f_0$=1 cm at the design wavelength of $\lambda_0$=500 nm, and a diameter of 4.096 mm (corresponding to f-number ~2.4). A key advantage of the G-Fresnel is that a small f-number can be realized in a thin-film element, opening the possibility of an ultra-compact spectrometer. The surface height profile of the constituent Fresnel lens is given by $$h_F(x, y) = \frac{m\lambda_0 - \left(\sqrt{x^2 + y^2 + f_0^2} - f_0\right)}{n-1} \quad (8)$$

$$\left((m-1)\lambda_0 \leq \sqrt{x^2 + y^2 + f_0^2} - f_0 < m\lambda_0\right)$$

where m=1, 2, 3 . . . M is the Fresnel zone number.

Figure 7:
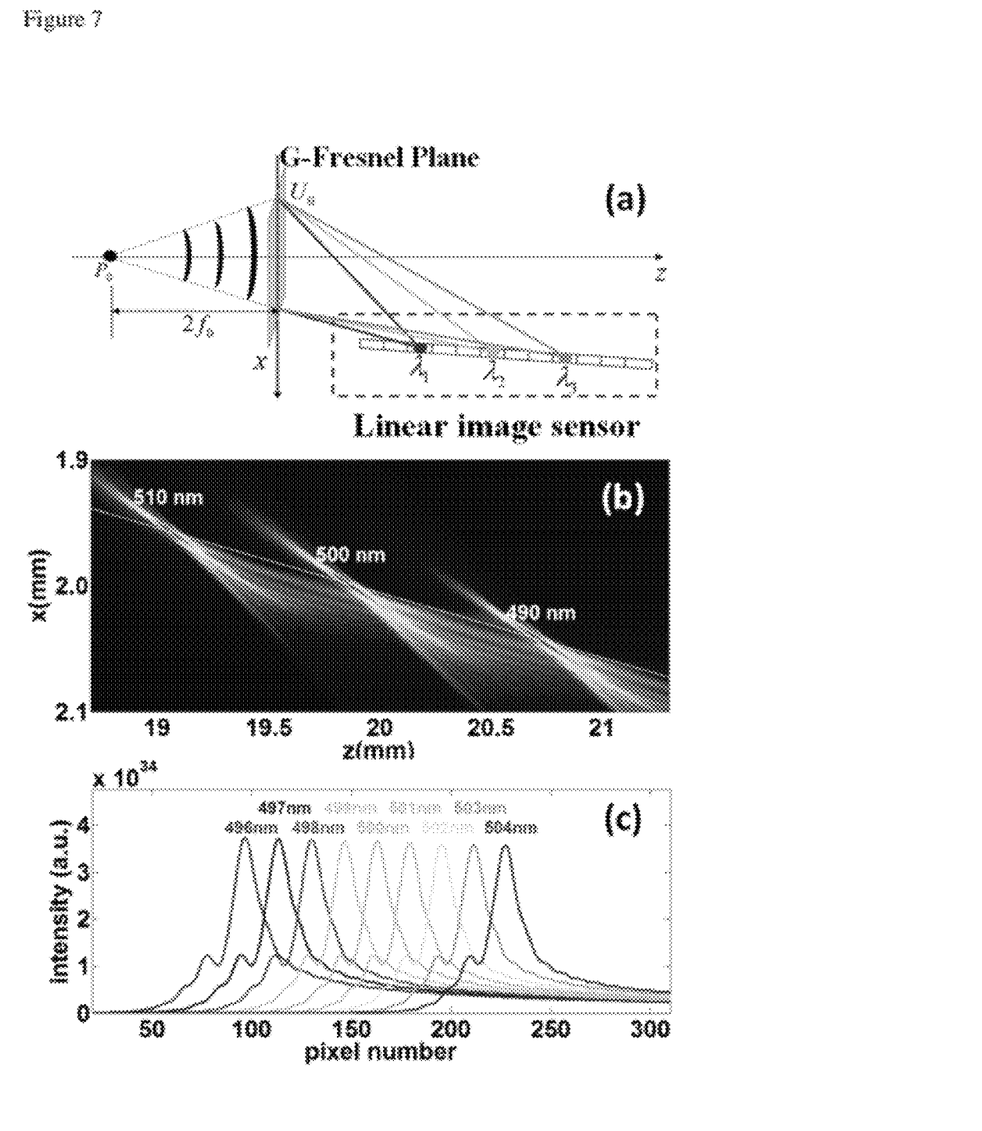
FIG. 7(a) shows a schematic diagram illustrating the geometric configuration used in our simulation.
FIG. 7(b) shows a calculated intensity distribution of the $1^{st}$ order diffraction patterns at three representative wavelengths (490 nm, 500 nm, 510 nm); locus of the foci can be fitted with a dotted line.
FIG. 7(c) shows calculated point spread functions at multiple wavelengths (496 nm-504 nm) on a tilted hypothetical detector with its position optimized to match with the experimental result shown in FIG. 8(c).

To quantitatively evaluate the achievable spectral resolution, a monochromatic point source is hypothetically placed at 2 cm (i.e., $2f_0$) away from the G-Fresnel [FIG. 7(a)]. The field $U_0(x, y)$ immediately after the G-Fresnel (z=0) is given by $$U_0(x, y) \propto \frac{\exp(jkr)}{r} P(x, y) T(x, y) \quad (9)$$

$$r = \sqrt{(2f_0)^2 + x^2 + y^2} \quad (10)$$

where P(x, y) is the pupil function. The field $U_1(x, y, z)$ behind the G-Fresnel can then be obtained by applying the Huygens-Fresnel Principle.

$$U_1(x, y, z) \propto \frac{1}{j\lambda} \int\int_\Sigma U_0(\xi, \eta) \frac{\exp(jkr)}{r_{0,1}} \cos\theta d\xi d\eta \quad (11)$$

$$r = \sqrt{(x-\xi)^2 + (y-\eta)^2 + z^2} \quad (12)$$

$$\cos\theta = z/r_{01} \quad (13)$$

We first calculated the intensity distribution in a region surrounding the geometric image [1.9 mm≤x≤2.1 mm and 18.7 mm≤z≤21.3 mm, see the rectangle marked in FIG. 7(a)]. The 1st-order diffraction patterns (summed up in y direction) at three representative wavelengths (490 nm, 500 nm and 510 nm) are shown in FIG. 7b. The dual functionality of focusing and dispersion of the designed G-Fresnel can be clearly observed. The foci of different wavelengths are found to be located along a tilted line with a slope given by $dx/dz=\lambda_0 f_0/(\Lambda d)=0.5$, where $d=2f_0$ and $\Lambda$ is the grating period.

Assume that an arrayed detector (pixel pitch: 5 μm) is placed along the line [FIG. 7(b)]. By optimizing the intercept while maintaining the slope, the point spread functions on the hypothetical detector at multiple wavelengths (from 496 nm to 504 nm with 1 nm separation) can be calculated and are plotted in FIG. 7(c), which indicates that a spectral resolution of approximately 1 nm can be achieved. It should be noted that similar analysis could also be applied to a reflection-type G-Fresnel, which can fold the optical beam path and result in a more compact design.

Example 3

Compact Spectrometer

Figure 8:
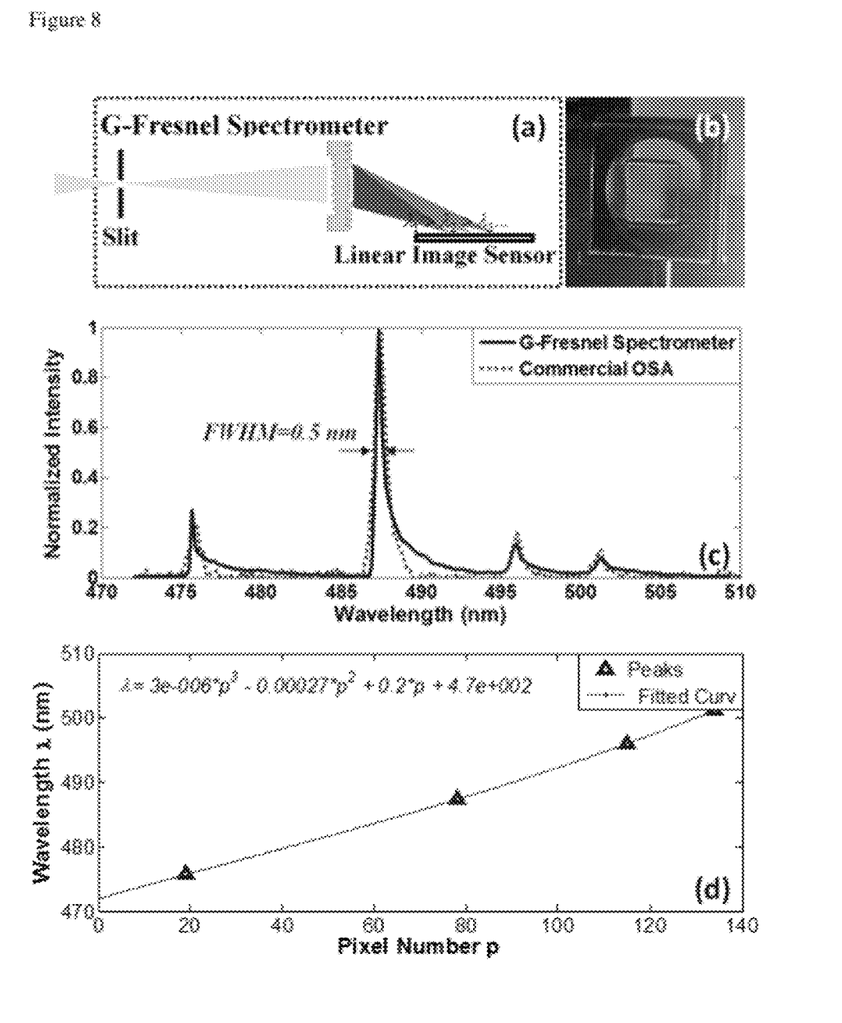
FIG. 8(a) shows a schematic diagram of a G-Fresnel spectrometer.
FIG. 8(b) shows a mounted G-Fresnel device.
FIG. 8(c) shows the partial spectrum of an argon ion laser measured by the G-Fresnel spectrometer and a commercial optical spectrum analyzer.
FIG. 8(d) shows a calibrated pixel-wavelength relation.

Example 3 reports the results of a proof-of-concept experimental study to demonstrate the feasibility and functionality of a G-Fresnel based spectrometer. In this example we utilized PDMS soft lithography to fabricate a prototype double-sided transmission-type G-Fresnel. PDMS pre-polymer was poured onto a Fresnel lens (diameter, 2 in. (5 cm); focal length, 100 mm at design wavelength 821 nm). After curing, a negative Fresnel lens mold was obtained. Next, we sandwiched PDMS prepolymer between this negative Fresnel lens mold and a diffraction grating (THORLABS GR25-0310, 300 lines/mm). After it was in situ cured for 48 hours at room temperature, a double-sided transmission-type G-Fresnel was fabricated as shown in FIG. 8(b) with a device area of about 1 in.×1 in. (2.54 cm×2.54 cm).

A proof-of-concept spectrometer was then built on an optical table as illustrated in FIG. 8(a). It includes an entrance slit, the G-Fresnel [FIG. 8(b)], and a CMOS linear image sensor (Hamamatsu S8378) tilted to accommodate the locus of the foci of different wavelengths. The incoming light, after passing through the slit and being collected, dispersed and focused by the G-Fresnel, form a spectrum on the image sensor. The detected signal was subsequently digitized by a peripheral-component-interconnect-based data acquisition device (National Instruments, PCI-6251) and analyzed in National Instruments LabVIEW software. To calibrate the spectrometer, an argon ion laser (Melles Griot 532-GS-A01) which lases at multiple wavelengths was focused into the entrance slit and had its spectrum measured.

By comparing the normalized spectrum measured by our G-Fresnel spectrometer [FIG. 8(c)] with the one obtained from a commercial optical spectrum analyzer (ANDO AQ-6315E, spectral resolution, 0.5 nm), the pixel-wavelength relation of our spectrometer can be calibrated by having the four peaks aligned as shown in FIG. 8(c). The relation can be fitted by a cubic polynomial function [FIG. 8(d)]. Note that the FWHM measured in FIG. 8(c) shows that this spectrometer has a sub-nm spectral resolution.

Figure 9:
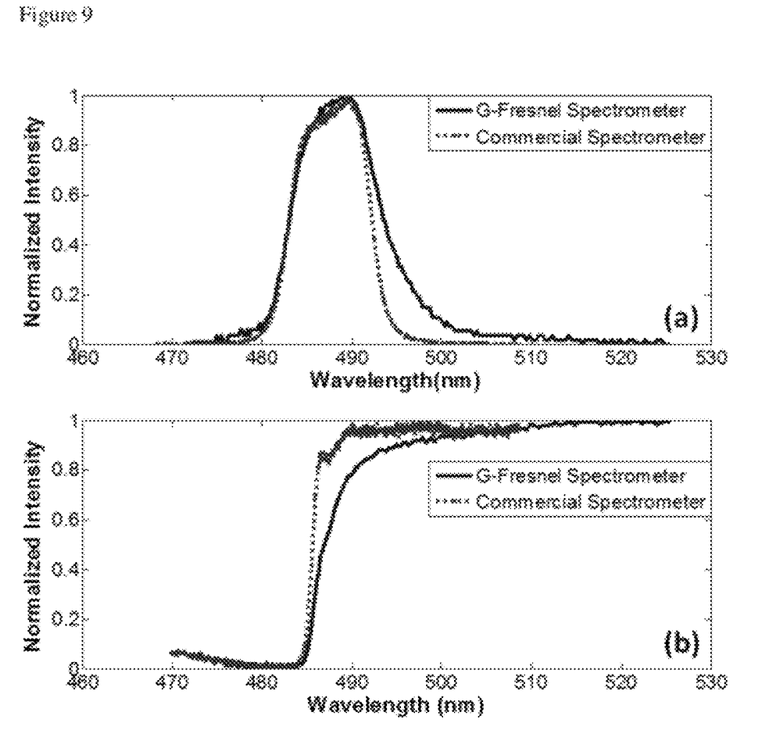
FIG. 9 shows the measured transmission spectrum of a laser-line filter (a) and a long-pass filter (b).

Next, we used this calibrated G-Fresnel spectrometer to characterize a laser-line filter (THORLABS FL488-10, CWL=488±2 nm, FWHM=10±2 nm) and a long-pass filter (CHROMA HQ485LP). To this end, a white light source (ROI 150 Illuminator) was utilized to illuminate the filters. The transmitted light was focused onto the entrance slit. The normalized transmission spectra of the laser-line filter and the long-pass filter measured by our spectrometer were shown in FIG. 9 (blue curve). For comparison, we also measured the filter transmission spectra (red) by using a commercial high-resolution spectrograph with a liquid nitrogen cooled charge coupled device camera (PI/Acton SpectraPro 2500, spectral resolution: 0.09 nm). These measured results agree with each other well except that the long wavelength side of the point spread function measured by the G-Fresnel spectrometer shows a slowly decaying tail [FIG. 8(c)], which leads to noticeable deviations as can be observed in FIG. 9. This is likely due to the aberration introduced by the G-Fresnel and possible fabrication errors, which could be mitigated by improved fabrication accuracy and post-measurement data processing.

Any documents referenced above are incorporated by reference herein. Their inclusion is not an admission that they are material or that they are otherwise prior art for any purpose.

We claim:

1. A diffractive optical element, comprising:
   a Fresnel side comprising a plurality of concentric chirped annular grooves, wherein each of said grooves is of smaller pitch than the preceding one; and
   a grating side including a reflective coating covering the grating side and comprising a plurality of linear grooves;
   wherein said Fresnel side and said grating side are separated by at least one enclosed void, and wherein the Fresnel side and the grating side are connected, opposite faces of a single double-sided optical element;
   and wherein said diffractive optical element has a phase function comprising a radially quadratic phase distribution component and a one-dimensional linear phase distribution component, wherein said diffractive optical element has the dual properties of focusing an impinging optical wave and dispersing different wavelengths of light.

2. The diffractive optical element of claim 1, wherein the diffractive optical element has a transmittance or a reflectance that are proportional, respectively, to the product of transmittance or reflectance of a linear grating and transmittance or reflectance of a Fresnel lens, wherein transmittance and reflectance of the diffractive mathematically described by the equation $$t(x, y) \propto \eta(\lambda)e^{-j\frac{\pi}{\lambda F}(x^2+y^2)}e^{j\frac{2\pi}{\Lambda}x}$$

where t(x, y) is the transmittance or reflectance of the diffractive focal element, $\lambda$ is the wavelength, F is the focal length of the Fresnel lens, and $\Lambda$ is the period of the grating.

3. The diffractive optical element of claim 1, further comprising a coating on said Fresnel side.

4. The diffractive optical element of claim 1, wherein said coating on said grating side is a metallic coating.

5. The diffractive optical element of claim 1, wherein each of said at least one enclosed voids includes a fluid.

6. The diffractive optical element of claim 5, wherein said fluid is selected from the group consisting of water, alcohol, and atmospheric air.

7. A spectrometer comprising a slit, a detector array, and a single dispersive element consisting of a single diffractive optical element, said single diffractive optical element comprising a Fresnel side comprising a plurality of concentric chirped annular grooves, wherein each of said grooves is of smaller pitch than the preceding one; and
a grating side comprising a plurality of linear grooves;
wherein said single diffractive optical element has a phase function comprising a radially quadratic phase distribution component and a one-dimensional linear phase distribution component, wherein said diffractive optical element has the dual properties of focusing an impinging optical wave and dispersing different wavelengths of light, and wherein the spectrometer only has a single dispersive element.

8. The spectrometer of claim 7, wherein said diffractive optical element comprises a reflective coating on the grating side, and wherein a diverging optical wave emanating from the slit is both dispersed and focused after reflection by the diffractive optical element so that different wavelengths are separated and subsequently detected by the detector array at positions along the locus of the foci of the different wavelengths.

9. The spectrometer of claim 7, wherein said spectrometer is miniaturized by integrating the diffractive optical element with at least one portable photonic device or electronic device.

* * * * *